United States Patent [19]

Fox

[11] Patent Number: 5,076,969
[45] Date of Patent: Dec. 31, 1991

[54] FIRE-RETARDANT

[75] Inventor: Malcolm F. Fox, Leicester, England

[73] Assignee: Pyrotex Ltd., London, England

[21] Appl. No.: 598,712

[22] PCT Filed: Feb. 23, 1989

[86] PCT No.: PCT/GB89/00180
§ 371 Date: Oct. 23, 1990
§ 102(e) Date: Oct. 23, 1990

[87] PCT Pub. No.: WO89/08137
PCT Pub. Date: Sep. 8, 1989

[30] Foreign Application Priority Data

Feb. 23, 1988 [GB] United Kingdom ............... 8804129
Feb. 23, 1988 [GB] United Kingdom ............... 8804130

[51] Int. Cl.$^5$ ............................................. B09K 21/00
[52] U.S. Cl. ................................. 252/601; 252/607; 252/608; 106/18.12; 106/18.32
[58] Field of Search ................. 428/248, 505, 921; 252/601, 608, 607; 106/18.12, 18.32

[56] References Cited

U.S. PATENT DOCUMENTS

| 2,935,471 | 5/1960 | Aarons et al. | 252/8.1 |
| 4,216,261 | 8/1980 | Dias | 428/264 |
| 4,448,841 | 5/1984 | Glass et al. | 428/270 |
| 4,560,485 | 12/1985 | Székely et al. | 252/7 |
| 4,725,382 | 2/1988 | Lewchalermwong | 252/607 |
| 4,784,918 | 11/1988 | Klett et al. | 428/447 |
| 4,806,620 | 2/1989 | Klett et al. | 528/244 |
| 4,956,217 | 9/1990 | Heitkamp | 428/116 |

FOREIGN PATENT DOCUMENTS 1444833 12/1966 France .

Primary Examiner—Robert L. Stoll
Assistant Examiner—Nina Bhat
Attorney, Agent, or Firm—Foley & Lardner

[57] ABSTRACT

A fire-retardant composition comprises a mixture or reaction product of fire-retardant ammonium salt, urea or biuret, and boric acid or a plastic composition of a sodium silicate-impregnated mat which can be applied to a substrate by transfer from a non-adherent backing sheet.

8 Claims, No Drawings

FIRE-RETARDANT

FIELD OF THE INVENTION

This invention relates to fire-retardants.

SUMMARY OF THE INVENTION

A first composition of the present invention comprises a mixture or reaction product of a fire-retardant ammonium salt, urea or biuret, and boric acid.

A second product of the invention comprises a non-adherent substrate sheet bearing a plastic composition of a sodium silicate-impregnated mat.

DESCRIPTION OF THE INVENTION

The salt in the first composition is preferably selected from monoammonium phosphate, diammonium phosphate, ammonium sulphamate, ammonium sulphate, and mixtures thereof. The first composition can exist in dry form, e.g. as a white, water-soluble powder, or it may be provided in aqueous solution, for which purpose a surfactant may be added. The actual components of the first composition of the invention may be urea salts, e.g. urea (poly)phosphates and urea borates.

A first composition of the invention is usually prepared by first mixing the ammonium salt, urea or biuret and boric acid to give a dry mixture which may then be dissolved in water. With respect to the amount of solids, there may be 25–75% by weight of the salt (or mixture of ammonium salts), 10–40% by weight of urea or biuret and 10–30% by weight boric acid. Because these components may react to give the desired reaction product, alternative components may be used to give the same or a similar result. A first composition of the invention in aqueous form may comprise 5–40% by weight of the solids.

A first composition of the invention, usually in aqueous form, can be applied to a variety of substrates to impart fire-retardancy. Application may be by casting, spraying or any other suitable technique. The substrate may be, for example, metal, wood, wood-derived products, and textiles, e.g. of natural fibres or of a blend of natural and synthetic materials.

For any particular application, a first composition of the invention may include various additives which facilitate its use. For example, a storage-stable liquid fire-retardant suitable for protecting, e.g., wood, may be prepared by adding water glass (which of course has fire-retardant properties) to an aqueous first composition of the invention. A corrosion inhibitor such as urotropine (say in an amount of up to 0.5% by weight of the composition) may be added where the first composition is to be applied to a metal, e.g. steel, structure. Portland cement may be added, for extra strength, e.g. in an amount of up to 7% by weight of the first composition. Depending on the application, an anionic or cationic surfactant may be suitable.

A first composition of the invention may comprise a filler such as glass microspheres, perlite, ballotini, vermiculite, mineral wool or waste from ground leather, mineral sanding or foundry sand. Fillers having a particle size of 200–300 mesh are suitable. A foaming agent, e.g. an anionic or neutral surfactant, may be added if an expanded/aerated structure is desired. Another preferred additive is a hardener such as sodium silicofluoride or polyethylene/polypropylene glycol diacetate. Especially for spraying, a resin such as a low-viscosity melamine-formaldehyde, urea-formaldehyde or acrylic latex may be included, without reducing fire-retardancy. Dyes or pigments may be added, as desired.

For application by spraying, to give a filled coating, a double-feed gun or other means, whereby the fire-retardant formulation is prepared immediately before application, may be used. For example, one feed comprises a liquid first composition of the invention and hardener (freshly-prepared) and the other comprises filler.

Use of first compositions of the invention provides coatings which have good heat-resistance. On rigid foam materials such as polystyrene or polyurethane, the coated product can resist heat and fire, and the coating may remain intact while the foam melts. If desired, a water-impermeable coating may be applied in addition.

Suitable amounts of additives will be apparent from the following illustrative Examples, in which all parts and percentages are by weight.

EXAMPLE 1

33 parts monoammonium phosphate, 12.8 parts diammonium phosphate, 23.2 parts urea, 12.5 parts ammonium sulphamate and 18 parts boric acid were mixed to give a white, water-soluble powder. The powder was mixed with 0.5 parts of a surfactant and formulated as a 20% aqueous solution. The pH was 7.0. The solution was anti-fungal, anti-wood pest and non-toxic to humans and animals.

The solution, having a neutral pH, is particularly suited to the treatment of textiles. Depending on a number of factors such as the density of weave of the fabric, its bulk, and the content of synthetic fibres, the solution may be applied at a level of 8 to 200 g/m$^2$.

EXAMPLE 2

3 parts of the solution of Example 1, and 7 parts sodium silicate, density 1.45 g/cm$^3$, were blended slowly, using a mixer stirring at least 300 rpm, to give a viscous solution. This solution had a density of 1.395 g/cm$^3$ at 20° C., a viscosity of 16±2s (Ford Cup No. 4 at 20° C.), a pH of 11.6 and a dry mass of 42.7%. The solution is anti-fungal, anti-pest, storage-stable and, while its viscosity is high below 10° C., heating restores its desired properties. It can be mixed with water in any proportions. It is suitable for application to wood at a level of 150 to 400 g/m$^2$ and at a level of 200 to 700 m$^2$ for more porous substrates, e.g. chipboard.

EXAMPLE 3

9 liters of the solution of Example 2 and 4.5 kg perlite were mixed. 0.9 kg sodium silicofluoride was added to give a hardened filled material, suitable for rendering and coating.

EXAMPLE 4

15 liters of the solution of Example 2 and 2 kg mineral wool were mixed. 0.6 kg sodium silicofluoride was added to give another hardened filled material suitable for rendering and coating.

EXAMPLE 5

A casting material for slabs was prepared from 48% of the solution of Example 2, 3% of a foaming agent, 44% glass microspheres and 4% sodium silicofluoride. The solution and the filler were mixed, the mixture was then aerated by the addition of the foaming agent, with stirring. The hardener was then added. Less hardener could be used, although the hardening time was then longer.

EXAMPLE 6

A spraying material was prepared from 48% of the solution of Example 2, 4% of a low-viscosity melamine-formaldehyde resin, 44% glass microspheres (200–300 mesh) and 4% sodium silicofluoride. The solution, resin and hardener were discharged through one feed, and the hardener through the other feed, of a double-feed gun. The resin could be replaced by urea-formaldehyde or an acrylic latex, to the same end.

EXAMPLE 7

A spraying material was prepared from 15 liters of the solution of Example 2, 2 kg mineral wool, 0.6 kg sodium silicofluoride powder plus, if desired, 7% by weight Portland cement. A double-feed gun was used in a manner parallel to that of Example 6.

The second aspect of the invention can provide, in particular, a thin, translucent, flexible material that may be bonded to other materials. When exposed to high temperatures or directly to flame, the material expands to give an inorganic layer. The gases evolved are predominantly water and carbon dioxide, i.e. essentially non-toxic.

The components of a second product according to the present invention are preferably a glass fibre mat or other material having an open texture, according to the thickness of the final sheet; a sodium silicate solution, e.g. applied at a level of 120 to 180 gm/m$^2$; a plasticiser and/or hardener such as polyvinyl alcohol, e.g. in an amount of 3 to 5%, dependent upon the flexibility of final product requirement; a surface coating such as an epoxy varnish coating, e.g. in an amount of 30 to 40 gm/m$^2$; and a surfactant, e.g. an anionic surfactant, preferably in an amount of 0.5 to 1.0%. Novel aspects of the invention may lie in combinations of two or more of these components, and particularly in combinations formed at various stages of use of the components, e.g. as described below.

An illustrative embodiment of the invention comprises the following procedure: the glass fibre mat is laid upon a non-adherent sheet, such as a thin aluminum sheet, and smoothed flat. A PTFE sheet may be used instead. The sodium silicate is mixed with the detergent and then with the polyvinyl alcohol, while stirring thoroughly. The mix is then spread on the fibre glass mat and allowed to set.

When set, the translucent material is peeled from its backing and bonded to a substrate to be protected, such as wood (as a surface coating), particle board, fabric, textiles or paper (as a backing), e.g. using a standard bonding press such as would be used for veneers, laminates, etc. The temperature should not exceed 110° C. The exposed surface and edges of the finished laminate are preferably covered with an epoxy or other water-impermeable coating, thus preventing absorption of water and tackiness of the silicate.

When used as a fire-resistant intumescent coating, a 0.7–1.0 mm thick coating of the composition bonded to a barrier of wood/wood composite construction such as door should give 30 minutes protection from a fire on the opposite side of the barrier. Two thicknesses, on opposite sides of the wooden barrier, should give more than 60 minutes fire protection.

A coating 3 mm thick was tested in an oven. For an applied temperature built up to 750° C., 21 minutes elapsed before 150° C. was reached; for an oven temperature building up to 900° C., it took 49 minutes to reach 500° C.

I claim:

1. An aqueous composition which comprises sodium silicate; a fire-retardant ammonium salt; urea or biuret; and boric acid.

2. A composition according to claim 1, wherein the salt is selected from monoammonium phosphate, diammonium phosphate, ammonium sulphamate, ammonium sulphate, and mixtures thereof.

3. An composition according to claim 1, which additionally comprises a filler.

4. A composition according to claim 1, which additionally comprises a hardener.

5. A composition according to claim 1, which additionally comprises a surfactant.

6. A method for imparting fire-retardancy to a substrate, which comprises applying to the substrate an aqueous composition which comprises sodium silicate; a fire-retardant ammonium salt; urea or biuret; and boric acid.

7. A method according to claim 6, which comprises applying the composition by spraying, using a double-feed gun.

8. A method according to claim 6, which comprises the additional step of applying a water-impermeable coating.

* * * * *